United States Patent [19]

Metcalf et al.

[11] Patent Number: 4,663,965
[45] Date of Patent: May 12, 1987

[54] PRESSURE MONITORING

[76] Inventors: Eric Metcalf, Beech Lee, Vicarage Lane, Ropley, Alresford, Hampshire; Peter Ormiston, The Barn, Horsemen Green Lane, Climping, West Sussex; Michael J. Skinner, 18 Jubilee Lane, Boundstone, Farnham, Surrey; Bruce J. Pike, 55 The Verne, Church Crookham, Hampshire, all of United Kingdom

[21] Appl. No.: 672,421

[22] Filed: Nov. 16, 1984

[30] Foreign Application Priority Data

Nov. 16, 1983 [GB] United Kingdom ............... 8330583

[51] Int. Cl.$^4$ ............................................. G01M 3/34
[52] U.S. Cl. ........................................ 73/49.3; 73/597
[58] Field of Search ............... 73/49.3, 629, 597, 598, 73/614, 703; 340/686, 687

[56] References Cited

U.S. PATENT DOCUMENTS

| 3,140,612 | 7/1964 | Houghton et al. | 73/703 |
|---|---|---|---|
| 3,238,774 | 3/1966 | Gurtler | 73/49.3 |
| 3,576,126 | 4/1971 | Weighart | 73/614 |
| 4,307,611 | 12/1981 | Opara | 73/629 |
| 4,393,714 | 7/1983 | Schmidt | |
| 4,393,715 | 7/1983 | Lombard | |
| 4,420,727 | 12/1983 | Rau | 340/686 |

FOREIGN PATENT DOCUMENTS

| 0091725 | 10/1983 | European Pat. Off. | |
|---|---|---|---|
| 2183077 | 12/1973 | France | 73/49.3 |
| 1100723 | 1/1968 | United Kingdom | 73/49.3 |
| 1100871 | 1/1968 | United Kingdom | |
| 1142314 | 2/1969 | United Kingdom | |
| 1276294 | 6/1972 | United Kingdom | |
| 1545228 | 5/1979 | United Kingdom | |
| 2049188 | 12/1980 | United Kingdom | |
| 1581287 | 12/1980 | United Kingdom | |

Primary Examiner—Charles Frankfort
Assistant Examiner—W. Morris Worth
Attorney, Agent, or Firm—Dale Gaudier

[57] ABSTRACT

It is proposed to store spent nuclear fuel elements in welded-shut steel containers, which are filled with argon at about 2 atmospheres pressure. It is desirable to be able periodically to check the containers for leaks. The invention proposes to do this by providing apparatus for sensing the pressure within the container from outside the container. To achieve this, a pressure responsive bellows is mounted inside the container, such that changes in the container pressure move a metal plate attached to the bellows towards or away from a portion of the inside wall of the container. Then, if the container starts to develop a leak, the pressure will begin to drop, and the gap between the metal plate and the wall will change. This gap can be sensed from outside the container, by an ultrasonic pulse echo technique. Preferably, the bellows and plate are mounted within the head of the combined valve and lifting pintle by which the container is sealed.

15 Claims, 4 Drawing Figures

PRESSURE MONITORING

This invention relates to apparatus for monitoring the pressure within a sealed container from outside the container, and to pressure sensors for use in such apparatus.

It has been proposed to store spent nuclear fuel elements in sealed steel containers, which are filled with an inert gas, such as argon, at a pressure of about two atmospheres. Naturally, it is extremely desirable to be able to peridically check that the containers are still sealed, so that if a leak develops, prompt remedial action can be taken before there is any danger of contamination of the environment. To this end, it is an object of the present invention to provide apparatus for monitoring the pressure within such a sealed container, based upon a pressure sensor which can be incorporated into the container without degrading its integrity, and which can be used in conjunction with sensing means disposed outside the container to monitor the pressure within the container from outside the container.

According to one aspect of the present invention, there is provided apparatus for monitoring the pressure within a sealed container, the appratus comprising:

(a) a pressure sensor including:
- a base member adapted to form part of the wall of the container, said base member having first and second oppositely disposed sides which, in use, are respectively disposed inside and outside the container;
- a sealed, expansible, capsule secured to the first side of the base member, said capsule being arranged to expand if the pressure within the container falls; and
- a movable member integral with or coupled to the capsule and disposed so that expansion of the capsule tends to move the movable member towards or away from the first side of the base member; and (b) sensing means which is adapted to be coupled to the second side of the base member and which is responsive to changes in the disposition of the movable member with respect to the first side of the base member to sense a change in the pressure within the container.

The sensing means can be ultrasonic, and use pulse echo techniques either to sense the distance between the movable member and the second side of the base member (assuming there is an acoustically transmissive medium therebetween) or to sense the existence or absence of contact between the movable member and the second side of the base member.

Alternatively, the pressure sensor can include a resonantly vibratable member secured to the first side of the base member, and arranged to co-operate with the movable member such that its resonant frequency is affected by the movement of the movable member. In this case, the sensing means can comprise sonic, ultrasonic or electric pulse producing means which is arranged to excite resonant vibration of said vibratable member and which is further arranged either to sense the frequency of said vibration, or to sense the presence or absence of said vibration.

In a further alternative, the sensing means can be inductive, and arranged either to sense the distance between the movable member and the second side of the base member or the existence or absence of contact between the movable member and the second side of the base member.

In yet another alternative, the base member is provided with an electrode passing sealingly and insulatedly therethrough, said electrode defining with said movable member a capicitance whose value varies with movement of said movable member, said sensing means comprising means connectable to said electrode and the container for measuring the value of said capacitance.

The invention also includes pressure sensors adapted for use with any one of the different sensing means defined above.

The invention will now be described, by way of example only, with reference to the accompanying drawings, of which:

As already mentioned, it has been proposed to store spent nuclear fuel elements in sealed steel containers. The containers will by cylindrical containers, typically about 470 cm long by 35 cm in diameter. The proposal envisages that large numbers of the containers will be stored in a storage vault, in a concrete storage matrix having a large number of vertically disposed cylindrical channels, each capable of receiving at least one container. The vault will be provided with remote handling equipment, horizontally movable in two orthogonal directions, for lowering the containers into the channels, and for lifting them out again should that prove necessary.

Once the spent nuclear fuel elements have been placed in such a container, it is proposed to fill the container with argon at 2 atmospheres pressure, and to weld the container shut to seal it. The argon will be introduced into the container via a filler neck at the top of the container, which filler neck will contain a combined valve and closure plug. This closure plug will be movable axially into the filler neck after the introduction of the argon, from an open position to a closed position, and then welded in the closed position.

The present invention provides for the incorporation, in this closure plug, of a pressure sensor which will permit the pressure inside the container to be sensed from outside the container, preferably by means of measuring equipment carried by the aforementioned remote handling equipment. A closure plug incorporating such a pressure sensor is shown in FIG. 1.

Figure 1:
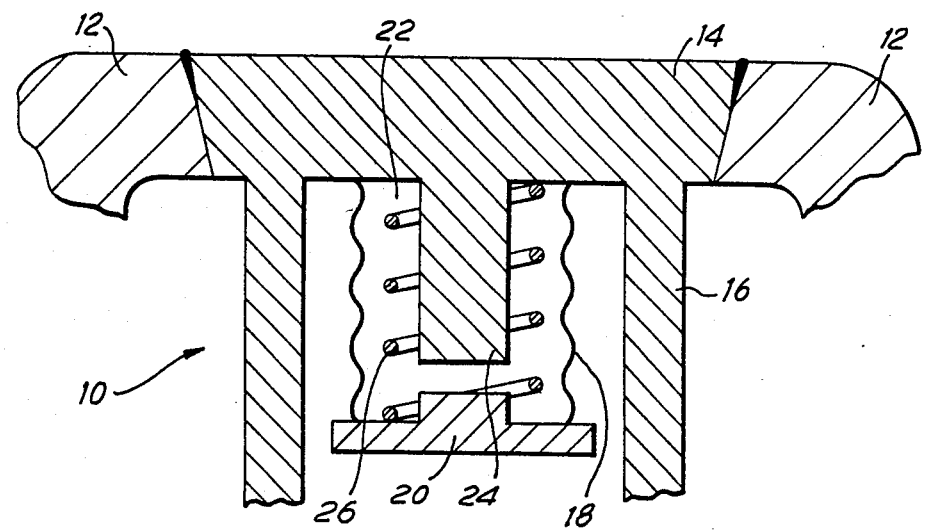
FIG. 1 is a simplified and somewhat diagrammatic sectional view of a container closure plug incorporating one embodiment of a pressure sensor forming part of pressure monitoring apparatus in accordance with the present invention.

Thus the closure plug of FIG. 1 is indicated generally at 10, and is shown welded into the opening in the top of the filler neck 12 of a sealed steel container of the kind described above, in order to close and seal the container. As already indicated, the container is filled with argon at about two atmospheres pressure.

The plug 10 comprises a circular base member 14, constituting the part thereof which is actually welded within the opening of the filter neck 12, and a hollow cylindrical skirt 16 which projects coaxially downwardly from the base member 14 into the interior of the filler neck. Prior to welding, the plug 10 is movable axially into and out of the filler neck 12, the skirt 16 being arranged to form with the interior of the filler neck 12 an additional valve which is closed when the plug 10 reaches the position shown in FIG. 1. However, this valve does not form part of the present invention, and so is not shown in FIG. 1.

Welded to the underside of the base member 14, within the skirt 16, is one end of a circular-section metal bellows 18. The bellows 18 is coaxial with the base member 14, and is closed at its other end by a welded-on circular steel plate (or disc) 20, also coaxial with the base member. The bellows 18 and the plate 20 thus together define a sealed expansible capsule 22 secured to the underside of the base member 14.

Disposed coaxially inside the capsule 22, and projecting from the base member 14, is a cylindrical stud 24, which is preferably formed integrally with the base member. The stud 24 projects towards and into close proximity with the plate 20, as will hereinafter become apparent. The downwardly facing end face of the stud 24 and the upwardly facing upper face of the plate 20, are precisely parallel to each other (and perpendicular to their common axis).

Also disposed coaxially within the capsule 22, and trapped in compression between the plate 20 and the base member 14, is a spring 26, which thus urges the plate 20 away from the free end of the stud 24.

The closure plug 10, having been welded into its sealed and pressurised container, can be used in two principal ways.

In the first way, the capsule 22 is evacuated during manufacture of the closure plug 10. Additionally, the respective dimensions of the bellows and the stud 24, and the respective stiffnesses of the bellows 18 and the spring 26, are selected such that while the pressure within the container remains at its proper level (i.e. about two atmospheres), the plate 20 firmly contacts the free end of the stud 24, but if the pressure within the container falls below its proper level by more than a given amount, the spring 26 will lift the plate 20 from the free end of the stud 24.

This lifting of the plate 20 is detected by ultrasonic pulse echo techniques, using an ultrasonic transmitter/receiver (or probe) placed in good acoustic contact with the exposed upper surface of the base member 14. While the plate 20 is in contact with the free end of the stud 24, then in response to each ultrasonic pulse directed downwardly (as viewed in FIG. 1) into the base member 14, a first echo will be received from the interface between the stud and the plate, and a second echo will be received from the lower face of the plate remote from this interface. However, when the plate lifts, this second echo will disappear.

In the second, and preferred, way of using the closure plug 10, the capsule 22 is filled with an inert gas, e.g. argon, typically at a relatively low pressure, for example one atmosphere or less, during manufacture of the closure plug. In this case, the aforementioned dimensions and stiffnesses are selected such that the plate 20 is just clear of the free end of the stud 24 when the pressure within the container is at its proper value. Then, if the pressure within the container begins to fall, the gap between the plate 20 and the free end of the stud 24 will progressively increase, and this increase can be detected using the aforementioned ultrasonic transmitter/receiver on the upper surface of the base member 14. This time, a first echo will be received from the free end of the stud 24, and a second echo will be received from the face of the plate 20 facing the stud 24, i.e. the upper face as viewed in FIG. 1. As the pressure within the container falls, the temporal spacing of these echoes will increase, thus enabling a continuous record of changes in the pressure to be kept.

Figure 2:
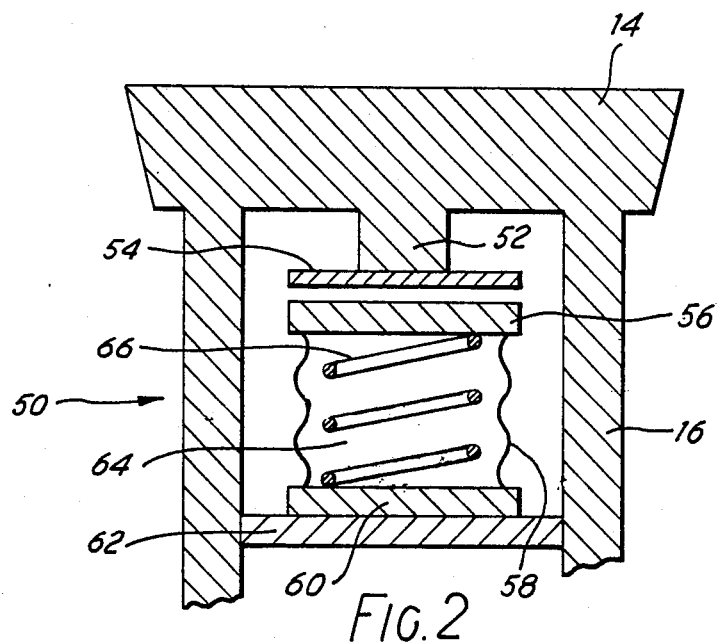
FIG. 2 is a simplified and again somewhat diagrammatic sectional view of a container closure plug incorporating another embodiment of a pressure sensor forming part of pressure monitoring apparatus in accordance with the present invention.

The closure plug shown in FIG. 2 is indicated generally at 50, and fits into the container in exactly the same way as the closure plug 10 of FIG. 1. To this end, the closure plug 50 has some parts in common with the closure plug 10, and these common parts have therefore been given the same reference numbers as were used in relation to the plug 10 of FIG. 1.

Thus the closure plug 50 includes the circular base member 14 and the hollow cylindrical skirt 16 of the plug 10, but welded to the underside of the base 14, coaxially within the skirt 16, is a short cylindrical stud 52 having a resonantly vibratable disc 54 coaxially secured to its free end. Closely adjacent the disc 54 is a circular plate 56, welded to and closing one end of a circular section metal bellows 58. The other end of the bellows 58 is closed by a welded-on metal disc 60, which is welded in turn to supporting bars 62 extending diametrically or chordally across the skirt 16. The bellows 58 and the plates 56, 60 thus define a sealed expansible capsule 64, which is coaxially disposed within the skirt 16. This capsule 64 is evacuated or filled with a low pressure inert gas during manufacture of the plug 50, and contains a spring 66 which urges the plate 56 towards the disc 54.

The disc 54 is made from a piezoelectric, magnetostrictive or other suitable material which can be remotely excited to produce resonant vibration of the disc. This resonant vibration is excited by a suitable sonic, ultrasonic or electric impulse producing means, which is placed in contact with the exposed upper surface of the base member 14, and which includes vibration sensing means responsive to the resonant vibration thus excited.

The capsule 64 and the spring 66 are designed such that while the pressure within the container remains at its proper level, the disc 54 and the plate 56 are spaced apart, but when this pressure falls below its proper level by more than a given amount, the plate 56 contacts the disc 54. As long as the disc 54 and the plate 56 are spaced apart, resonant vibration of the disc 54 can be excited as described, but as soon as they come into contact, the damping effect of this contact means that resonant vibration can no longer be excited. It is this presence or absence of resonant vibration which is sensed by the vibration sensing means.

Figure 3:
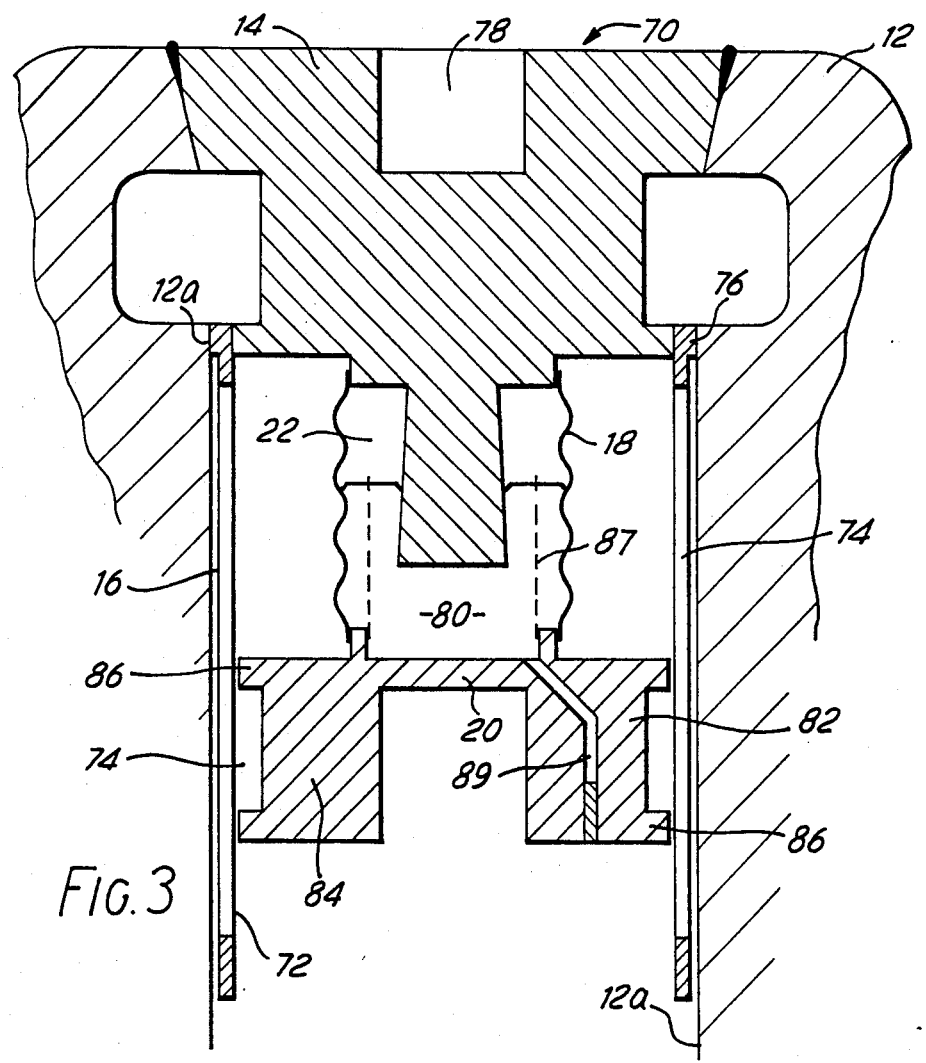
FIG. 3 is a simplified and diagrammatic sectional view of a modified version of the closure plug of FIG. 1.

The closure plug of FIG. 3 is indicated generally at 70, and again has some parts in common with the closure plug 10 of FIG. 1. These common parts have therefore been given the same reference numbers as were used in relation to the closure plug 10.

Thus the closure plug 70 includes the circular base member 14 and hollow cylindrical skirt 16 of the plug 10, but the skirt 16 is welded to the base member 14, and its lower part 72 is provided with a number of longitudinally extending slots 74. The lower (and much greater) part 72 of the skirt 16 is a close sliding fit within the lower portion 12a of the filler neck 12 of the container in which the plug 70 is fitted, the slots 74 being provided to facilitate filling the container with argon as described earlier. The upper (and unslotted) part 76 of the skirt 16 is an interference fit in the lower portion 12a of the filler neck 12, to provide the additional valve mentioned in relation to FIG. 1.

The exposed upper surface of the base member 14 is provided with a coaxially disposed cylindrical recess 78, for receiving and locating the aforementioned ultrasonic transmitter/receiver in exact alignment with the stud 24. To further improve the ultrasonic transmission characteristics of the combination of the base member 14 and the stud 24, the walls of the stud 24 diverge downwardly as viewed in FIG. 3, making an angle of about 4° with the axis of the stud.

To further improve the ultrasonic transmission characteristics of the remainder of the closure plug 70, the sealed capsule 22 is partially filled with mercury, as indicated at 80, such that the lower end of the stud 24 is immersed in the mercury. The mercury thus provides a good acoustic transmission path from the flat lower end of the stud 25 to the flat upper face of the plate 20 which defines the movable base of the capsule 22. To ensure that the mercury wets the lower end of the stud 24, this lower end is coated during manufacture with a layer of copper upon which is deposited a layer of silver. To eliminate troublesome additional echoes from the lower face of the plate 20, the thickness of the plate is selected to be one quarter, three quarters (or in the general case n quarters, where n is odd) of the predominant wave length of the ultrasonic pulses being directed downwardly into the base memeber 14.

It will be noted that the spring 26 of the closure plug 10 has been omitted from the closure plug 70, since sufficient resilience is provided by the springiness of the bellows and the compressibility of the gas trapped in the bellows above the mercury.

The disc 20 of the closure plug 70 is integrally formed as the base of an inverted cup-shaped member 82. The downwardly extending cylindrical wall 84 of the member 82 is provided with two axially-spaced, outwardly extending, cylindrical flanges 86, which are a close sliding fit within the skirt 16. This arrangement constrains the member 82 to move precisely parallel to its own axis and that of the stud 24, so maintaining the faces of the plate 22 precisely parallel to the end face of the stud 24. A filler port 89 extends longitudinally through the wall 84, generally parallel to the axis of the member 82, to permit the introduction of the mercury into the capsule 22 during manufacture.

To reduce the possibility of loss of mercury in the event that the bellows 18 is ruptured, the axial extent of the bellows can be reduced so that their maximum expected length in use is less than the length of the stud 24, the lower end of the bellows then being welded to a coaxially disposed containment wall which forms an extension of the bellows and which is welded to or integral with the plate 22. Alternatively, a separate such containment wall can extend upwardly from the plate 22 into the annular space between the bellows 18 and the stud 24, as shown in dotted lines at 87.

Several modifications can be made to the closure plug 70. For example, the mercury can be replaced by another suitable liquid metal, eg a mixture of gallium and indium in the approximate ratio of 3:1, optionally containing up to 10% tin. Alternatively, other suitable acoustically transmissive liquids can be used.

Figure 4:
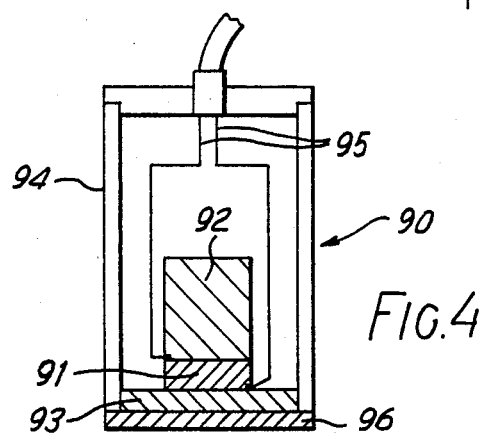
FIG. 4 is a sectional view of an ultrasonic probe for use with the sensor of FIG. 3.

FIG. 4 shows, on a slightly enlarged scale, an ultrasonic probe 90 suitable for use with the closure plug 70. The probe 90 comprises a piezo-electrical crystal 91, which is mounted between a cylindrical damping slug 92 and a disc 93 forming the front face of the probe 90. The disc 93 is secured in the open end of a cylindrical housing 94 made from stainless steel, through which electrical leads 95 enabling high voltage pulses to be applied between the front and rear faces of the crystal 91 are led. The space within the housing 94 around the crystal 91, the damping slug 92 and the lead 95 is filled with a suitable potting compound. An acoustic coupling pad 96, eg of polyurethane, is secured to the front face 90, to provide good coupling between this front face and the base member 14 when the probe 90 is located in the recess 78 (FIG. 3).

Many other modifications can be made to the described embodiments of the invention. For example, in the embodiment of FIG. 2, the stud 52 and disc 54 can simply be omitted, and the distance between the plate 56 and the underside of the base member 14 can be sensed ultrasonically as described in relation to FIG. 1. Further, in all the embodiments involving the use of ultrasonic pulse echo techniques, the surfaces from which the pulses are to be reflected can be shaped to preferentially reflect the pulses back in as close to the same direction from which they come as possible.

In another modification, a resonantly vibratable wire can be connected either between the free end of the stud 24 and the plate 20 of FIG. 1, or between the end of the stud 52 and the plate 56 of FIG. 2 (with the disc 54 simply being omitted). With this modification, changes in the pressure within the container will cause the respective capsule 22 or 64 to change the tension in, and thus the resonant frequency of, the wire, which change can be sensed by the aforementioned vibration sensing means.

In yet another modification, the base member 14 of FIG. 1 has an insulated electrode (e.g. of the kind presently offered for sale by the Applicants in connection with their HYDRASTEP boiler water level sensing apparatus) passing coaxially therethrough, in place of the stud 24 of FIG. 1 or the stud 52 and disc 54 of FIG. 2. A plate forming one plate of a capacitor is secured in electrical contact with the end of this electrode, just beneath the base member 14, the other plate of the electrode being constituted by the plate 20 of FIG. 1 or the plate 56 of FIG. 2. The pressure within the container can then be sensed by sensing the capacitance of this capacitor, as measured between the electrode and the container.

We claim:
1. Apparatus for monitoring the pressure within a sealed container, the apparatus comprising:
   (a) a combined closure means and pressure sensor including:
      a closure member for sealingly closing an opening of the container, said closure member having first and second oppositely disposed sides which, in use, are respectively disposed inside and outside the container;
      a sealed, expansible, capsule secured to the first side of the closure member, said capsule being arranged to expand if the pressure within the container falls;
      a movable member coupled to the capsule and disposed so that expansion of the capsule moves the movable member with respect to the first side of the closure member;
      wherein said capsule contains an acoustically transmissive liquid disposed between the movable member and the first side of the closure member; and (b) means disposed outside the container for directing ultrasonic pulses into the second side of the closure member and towards the first side thereof and thence into the container, said directing means including means for sensing said ultrasonic pulses transmitted into the container and for detecting changes in the position of the movable member with respect to the first side of the closure member, said sensing means includes means for receiving echo pulses which have been reflected back through the closure member, whereby in response to each ultrasonic pulse directed into the closure member, a first echo pulse is received by said sensing means from the first side of the closure member and a second echo pulse is received by said sensing means from the face of the movable member facing the first side of the closure member, the temporal spacing between each first echo pulse and its corresponding second echo pulse being representative of the spacing between the movable member and the first side of the closure member and thus representative of the pressure within the container.

2. Apparatus as claimed in claim 1, wherein said acoustically transmissive fluid is a liquid metal.

3. Apparatus as claimed in claim 1, wherein said acoustically transmissive fluid is mercury.

4. Apparatus as claimed in claim 3, wherein the surface of first side of the closure member in contact with the mercury is coated with a layer of copper during manufacture.

5. Apparatus as claimed in claim 4, wherein said surface is further coated during manufacture with a layer of silver on top of the layer of copper.

6. Apparatus as claimed in claim 1, wherein said acoustically transmissive fluid is a mixture of gallium and indium.

7. Apparatus as claimed in claim 6, wherein said mixture further includes up to 10% of tin.

8. Apparatus as claimed in claim 1, wherein the closure member is provided with a substantially cylindrical stud projecting therefrom towards the movable member, said stud having a substantially planar end surface which is perpendicular to the axis of the stud and constitutes the first side of the closure member.

9. Apparatus as claimed in claim 8, wherein the sides of said stud diverge from the axis of the stud with increasing distance from the closure member.

10. Apparatus as claimed in claim 9, wherein the angle between the sides of the stud and the axis of the stud is about 4°.

11. Apparatus as claimed in claim 8, wherein the capsule comprises a generally cylindrical bellows coaxial with the stud and expansible parallel to the axis of the stud, one end of the bellows being sealingly secured to the closure member around the stud and the other end being sealingly closed by the movable member, and wherein the movable member comprises a disc which is spaced from the end surface of the stud and whose opposite faces are both planar and parallel to the end surface of the stud.

12. Apparatus as claimed in claim 11, wherein the thickness of said disc is selected to be n/4 times the predominant wavelength of the ultrasonic pulses, where n is an odd integer.

13. Apparatus as claimed in claim 11, further comprising a cylindrical skirt member secured to the closure member coaxial with and surrounding the stud and the bellows, and wherein the movable member is provided with at least one cylindrical guide flange which is coaxial with and slidably engages the internal surface of the skirt member, the guide flange being secured to or integral with the disc so as to constrain the disc to move parallel to its own axis and the axis of the stud.

14. Apparatus as claimed in claim 11, further comprising a substantially cylindrical containment wall sealingly secured to the movable member so as to be coaxial with the stud and to extend from the movable member into the annular space between the stud and the bellows, the acoustically transmissive liquid being contained within said containment wall.

15. Apparatus as claimed in claim 1, wherein the second side of the closure member is provided with a recess to receive and locate the ultrasonic pulse directing and receiving means.

* * * * *